(12) United States Patent
Wang et al.

(10) Patent No.: US 10,455,624 B2
(45) Date of Patent: Oct. 22, 2019

(54) ORDERED PHYSICAL RANDOM ACCESS CHANNEL RESOURCE MANAGEMENT

(71) Applicant: QUALCOMM Incorporated, San Diego, CA (US)

(72) Inventors: Renqiu Wang, San Diego, CA (US); Xiao Feng Wang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/591,082

(22) Filed: May 9, 2017

(65) Prior Publication Data

US 2017/0332404 A1    Nov. 16, 2017

Related U.S. Application Data

(60) Provisional application No. 62/336,548, filed on May 13, 2016.

(51) Int. Cl.
*H04B 7/216* (2006.01)
*H04W 74/08* (2009.01)
(Continued)

(52) U.S. Cl.
CPC ..... *H04W 74/085* (2013.01); *H04W 72/0453* (2013.01); *H04W 72/1289* (2013.01); *H04W 74/06* (2013.01); *H04W 4/70* (2018.02)

(58) Field of Classification Search
CPC ................................................ H04W 741/085
See application file for complete search history.

(56) References Cited

U.S. PATENT DOCUMENTS 8,989,113 B2    3/2015  Mukherjee et al.
2013/0083749 A1  4/2013  Xu et al.
(Continued)

FOREIGN PATENT DOCUMENTS

EP    2177071 A1    4/2010
EP    2425661 A1    3/2012
(Continued)

OTHER PUBLICATIONS

Ericsson: "Random Access for NB-IoT", 3GPP TSG-RAN WG2 Meeting NB-IoT ad-hoc, R2-160470, Jan. 18, 2016, XP051054757, Retrieved from the Internet: URL:http://www.3gpp.org/ftp/Meetings_3GPP_SYNC/RAN2/Docs/, 6 pages.
(Continued)

*Primary Examiner* — Gerald A Smarth
(74) *Attorney, Agent, or Firm* — Patterson & Sheridan, LLP

(57) ABSTRACT

Certain aspects of the present disclosure generally relate to wireless communications and more specifically to transmission resource management for ordered physical random access channel (PRACH) signals. An example method performed by a base station generally includes providing an indication of a set of transmission resources, within a narrowband region of a wider system bandwidth, for transmitting scheduled physical random access channel (PRACH) signals by a first user equipment (UE) and transmitting a command to the first UE to transmit a scheduled PRACH.

26 Claims, 14 Drawing Sheets

(51) Int. Cl.
*H04W 72/04* (2009.01)
*H04W 72/12* (2009.01)
*H04W 74/06* (2009.01)
*H04W 4/70* (2018.01)

(56) References Cited

U.S. PATENT DOCUMENTS

| | | | |
|---|---|---|---|
| 2013/0136006 A1* | 5/2013 | Kim | H04L 5/001 370/241 |
| 2014/0046451 A1* | 2/2014 | Liccardo | A61F 2/0095 623/19.14 |
| 2014/0064250 A1 | 3/2014 | Wager et al. | |
| 2014/0169325 A1* | 6/2014 | Ratasuk | H04W 72/0406 370/330 |
| 2014/0198742 A1* | 7/2014 | Baldemair | H04W 74/0833 370/329 |
| 2014/0254538 A1* | 9/2014 | Park | H04L 1/0026 370/329 |
| 2015/0271791 A1* | 9/2015 | Webb | H04W 4/70 370/230 |
| 2016/0301503 A1* | 10/2016 | Rico Alvarino | H04B 1/713 |

FOREIGN PATENT DOCUMENTS

| | | |
|---|---|---|
| JP | 5542998 B2 | 7/2014 |
| WO | WO-2016072216 A1 | 5/2016 |

OTHER PUBLICATIONS

Intel Corporation: "On Random Access for NB-IoT", 3GPP TSG RAN WG1 NB-IoT Ad-Hoc Meeting, R1-160132, Jan. 17, 2016, XP051053451, Retrieved from the Internet: URL:http://www.3gpp.org/ftp/Meetings_3GPP_SYNC/RAN1/Docs, 8 pages.
International Search Report and Written Opinion—PCT/US2017/031897—ISA/EPO—dated Aug. 28, 2017.
MCC Support: Final Report of 3GPP TSG RAN WG1 #83 V1.0.0 (Anaheim, USA, Nov. 15-22, 2015), 3GPP TSG RAN WG1 Meeting #84, R1-160236, Feb. 14, 2016, XP051053575, Retrieved from the Internet: URL:http://www.3gpp.org/ftp/Meetings_3GPP_SYNC/RAN1/Docs/, 126 pages.
WI Rapporteur (Ericsson): "RAN1 agreements for Rel-13 NB-IoT", 3GPP TSG-RAN WG1 Meeting #84bis, R1-163943, Apr. 27, 2016, XP051090321, Retrieved from the Internet: URL:http://www.3gpp.org/ftp/tsg_ran/WG1_RL1/TSGR1_84b/Docs/ [retrieved on Apr. 27, 2016], 28 Pages.

* cited by examiner

ORDERED PHYSICAL RANDOM ACCESS CHANNEL RESOURCE MANAGEMENT

CROSS-REFERENCE TO RELATED APPLICATIONS

The present Application for Patent claims priority to U.S. Provisional Application No. 62/336,548, filed May 13, 2016, which is assigned to the assignee of the present application and hereby expressly incorporated by reference herein in its entirety.

BACKGROUND

Field of the Invention

Certain aspects of the present disclosure generally relate to wireless communications and more specifically to transmission resource management for ordered physical random access channel (PRACH) signals.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a base station (BS). The method generally includes providing an indication of a scheduled physical random access channel (PRACH) region comprising a set of transmission resources, within a narrowband region of a wider system bandwidth, for transmitting scheduled PRACH signals by a first user equipment (UE) and transmitting a first command to the first UE to transmit a scheduled PRACH.

Certain aspects of the present disclosure provide a method for wireless communications by a user equipment (UE). The method generally includes receiving a command from a base station (BS) to transmit a scheduled physical random access channel (PRACH) to the BS, obtaining an indication of a scheduled PRACH region comprising a set of transmission resources, within a narrowband region of a wider system bandwidth, for transmitting scheduled PRACH signals to the BS, and transmitting a PRACH signal to the BS using the indicated transmission resources.

Certain aspects of the present disclosure provide an apparatus for wireless communications. The apparatus generally includes a processing system configured to provide an indication of a scheduled physical random access channel (PRACH) region comprising a set of transmission resources, within a narrowband region of a wider system bandwidth, for transmitting scheduled PRACH signals by a first user equipment (UE) and to transmit a first command to the first UE to transmit a scheduled PRACH signal, and a memory coupled with the processor.

Certain aspects of the present disclosure provide an apparatus for wireless communications. The apparatus generally includes a processing system configured to receive a command from a base station (BS) to transmit a scheduled physical random access channel (PRACH) to the BS, to obtain an indication of a scheduled PRACH region comprising a set of transmission resources, within a narrowband region of a wider system bandwidth, for transmitting scheduled PRACH signals to the BS, and to transmit a PRACH signal to the BS using the indicated transmission resources, and a memory coupled with the processing system.

Certain aspects of the present disclosure provide an apparatus for wireless communications. The apparatus generally includes means for providing an indication of a scheduled physical random access channel (PRACH) region comprising a set of transmission resources, within a narrowband region of a wider system bandwidth, for transmitting scheduled PRACH signals by a first user equipment (UE) and means for transmitting a first command to the first UE to transmit a scheduled PRACH.

Certain aspects of the present disclosure provide an apparatus for wireless communications. The apparatus generally includes means for receiving a command from a base station (BS) to transmit a scheduled physical random access channel (PRACH) to the BS, means for obtaining an indication of a scheduled PRACH region comprising a set of transmission resources, within a narrowband region of a wider system bandwidth, for transmitting scheduled PRACH signals to the BS, and means for transmitting a PRACH signal to the BS using the indicated transmission resources.

Certain aspects of the present disclosure provide a computer-readable medium for wireless communications comprising instructions that, when executed by a processing system, cause the processing system to perform operations. The operations generally include providing an indication of a scheduled physical random access channel (PRACH) region comprising a set of transmission resources, within a narrowband region of a wider system bandwidth, for transmitting scheduled PRACH signals by a first user equipment (UE) and transmitting a first command to the first UE to transmit a scheduled PRACH.

Certain aspects of the present disclosure provide a computer-readable medium for wireless communications comprising instructions that, when executed by a processing system, cause the processing system to perform operations. The operations generally include receiving a command from a base station (BS) to transmit a scheduled physical random access channel (PRACH) to the BS, obtaining an indication of a scheduled PRACH region comprising a set of transmission resources, within a narrowband region of a wider system bandwidth, for transmitting scheduled PRACH signals to the BS, and transmitting a PRACH signal to the BS using the indicated transmission resources.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
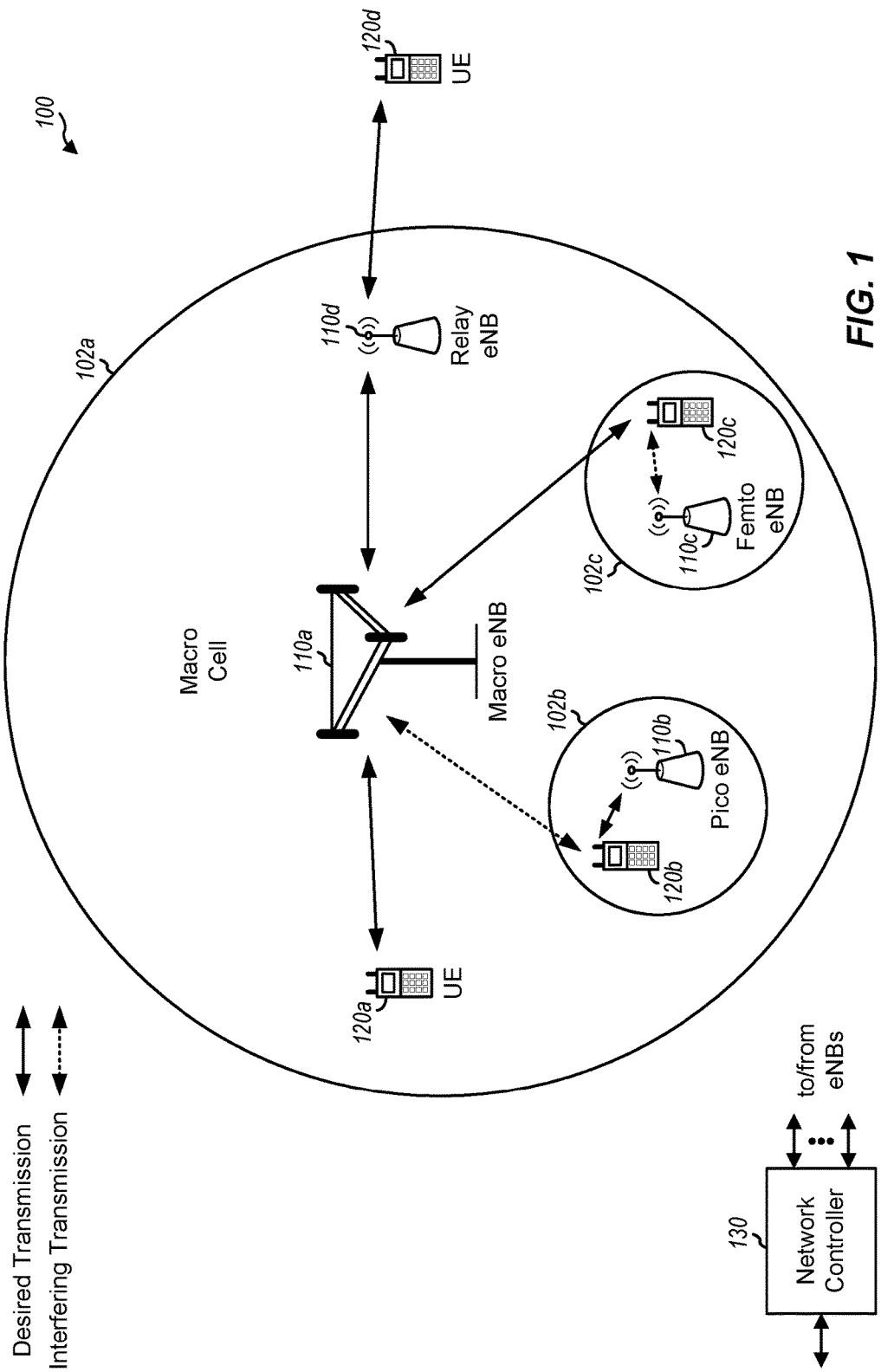
FIG. 1 is a block diagram conceptually illustrating an example wireless communication network, in accordance with certain aspects of the present disclosure.

Aspects of the present disclosure provide techniques and apparatus for scheduling physical random access channel (PRACH) signals for devices with limited communication resources, such as low cost (LC) machine type communication (MTC) devices, LC enhanced MTC (eMTC) devices, etc. MTC and eMTC devices may receive MTC physical downlink control channel (MPDCCH) transmissions carrying paging messages and RAR messages. MTC and eMTC devices may attempt to decode MPDCCH candidates in search spaces of time and frequency transmission resources. MPDCCHs may be transmitted in common search spaces (CSS). Base stations may transmit MPDCCHs conveying paging and RAR messages in CSS selected based at least in part on a coverage enhancement (CE) level of a receiving UE and/or a subband used by a UE when transmitting a physical random access channel (PRACH). To enhance coverage of certain devices, such as MTC and eMTC devices, "bundling" may be utilized in which certain transmissions are sent as a bundle of transmissions, for example, with the same information transmitted over multiple subframes.

Accordingly, as will be described in more detail below, the techniques presented herein may allow for cells to transmit and MTC devices to receive paging and RAR messages that are bundled to achieve CE of up to 15 dB. In addition, techniques presented herein may allow for cells to transmit and MTC devices to receive paging and RAR messages in situations when a cell needs to transmit both paging and RAR messages in one subframe, sometimes referred to as a collision between paging and RAR messages.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation. Some next generation, NR, or 5G networks may include a number of base stations, each simultaneously supporting communication for multiple communication devices, such as UEs. In LTE or LTE-A network, a set of one or more base stations may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, gNB, etc.). A base station or DU may communicate with a set of UEs on downlink channels (e.g., for transmissions from a base station or to a UE) and uplink channels (e.g., for transmissions from a UE to a base station or distributed unit). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

FIG. 1 illustrates an example wireless communication network 100 with base stations (BSs) and user equipments (UEs), in which aspects of the present disclosure may be practiced.

For example, one or more paging procedure enhancements for certain UEs (e.g., LC MTC UEs, LC eMTC UEs, etc.) in the wireless communication network 100 may be supported. According to the techniques presented herein, the BSs and LC UE(s) in the wireless communication network 100 may be able to determine, from the available system bandwidth supported by the wireless communication network 100, which narrowband region(s) the LC UE(s) should monitor for a bundled paging message transmitted from the BSs in the wireless communication network 100. Also, according to techniques presented herein, the BSs and/or LC UE(s) in the wireless communication network 100 may be able to determine and/or adapt the bundling size for the paging message based on one or more triggers in the wireless communication network 100.

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, navigation devices, gaming devices, cameras, a vehicular device, a drone, a robot/robotic device, a wearable device (e.g., smart watch, smart clothing, smart wristband, smart ring, smart bracelet, smart glasses, virtual reality goggles), etc. MTC UEs include devices such as sensors, meters, monitors, location tags, drones, trackers, robots/robotic devices, etc. UEs may be implemented as internet of everything (IoE) or internet of things (IoT) (e.g., narrowband IoT (NB-IoT)) devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
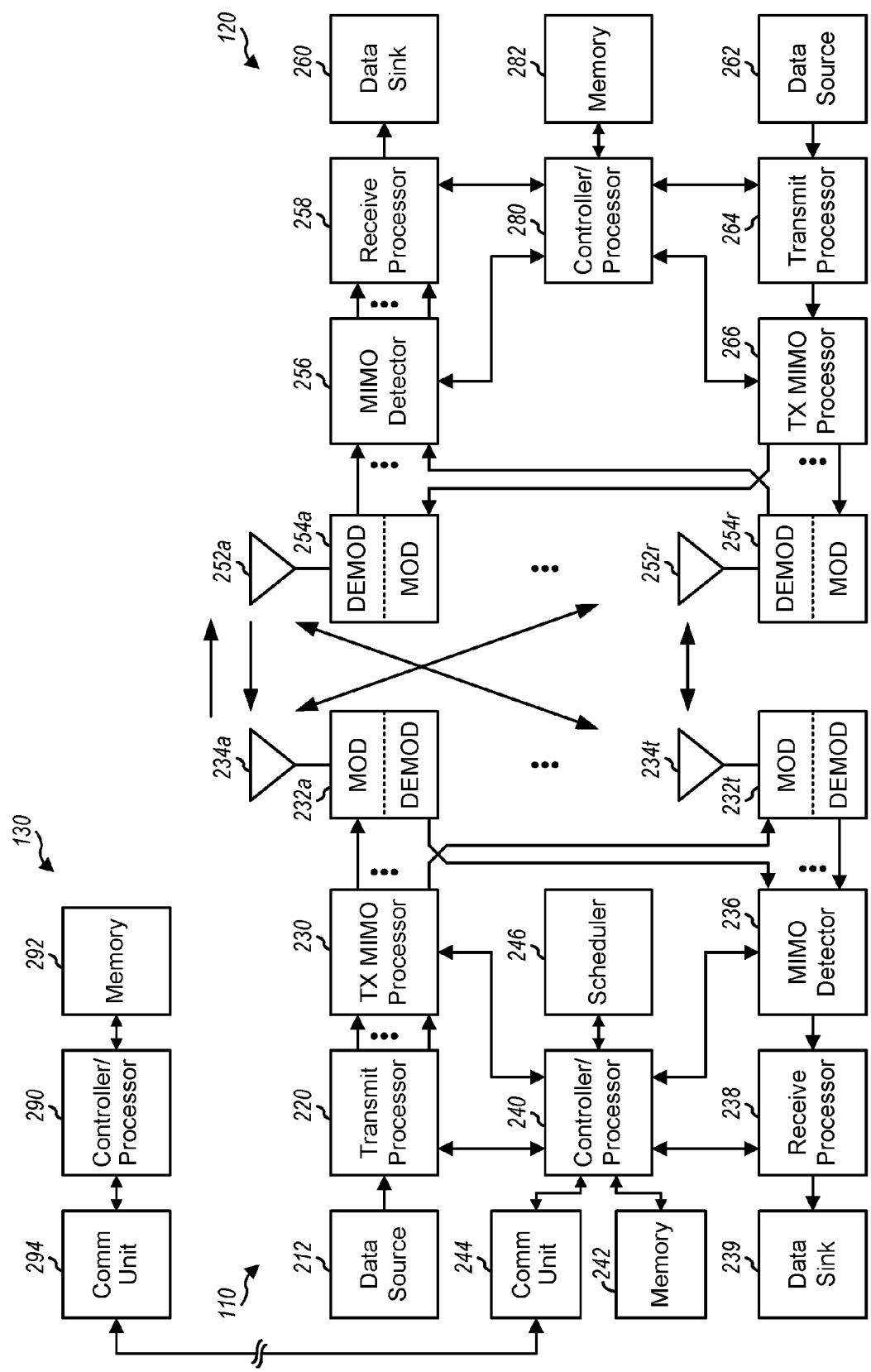
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations illustrated in FIG. 13 and/or other processes for the techniques described herein. Similarly, controller/processor 280 and/or other processors and modules at UE 120 may perform or direct operations illustrated in FIG. 14 and/or processes for the techniques described herein. Memories 242 and 282 may store data and program codes for BS 110 and UE 120, respectively. A scheduler 246 may schedule UEs for data transmission on the downlink and/or uplink.

Figure 3:
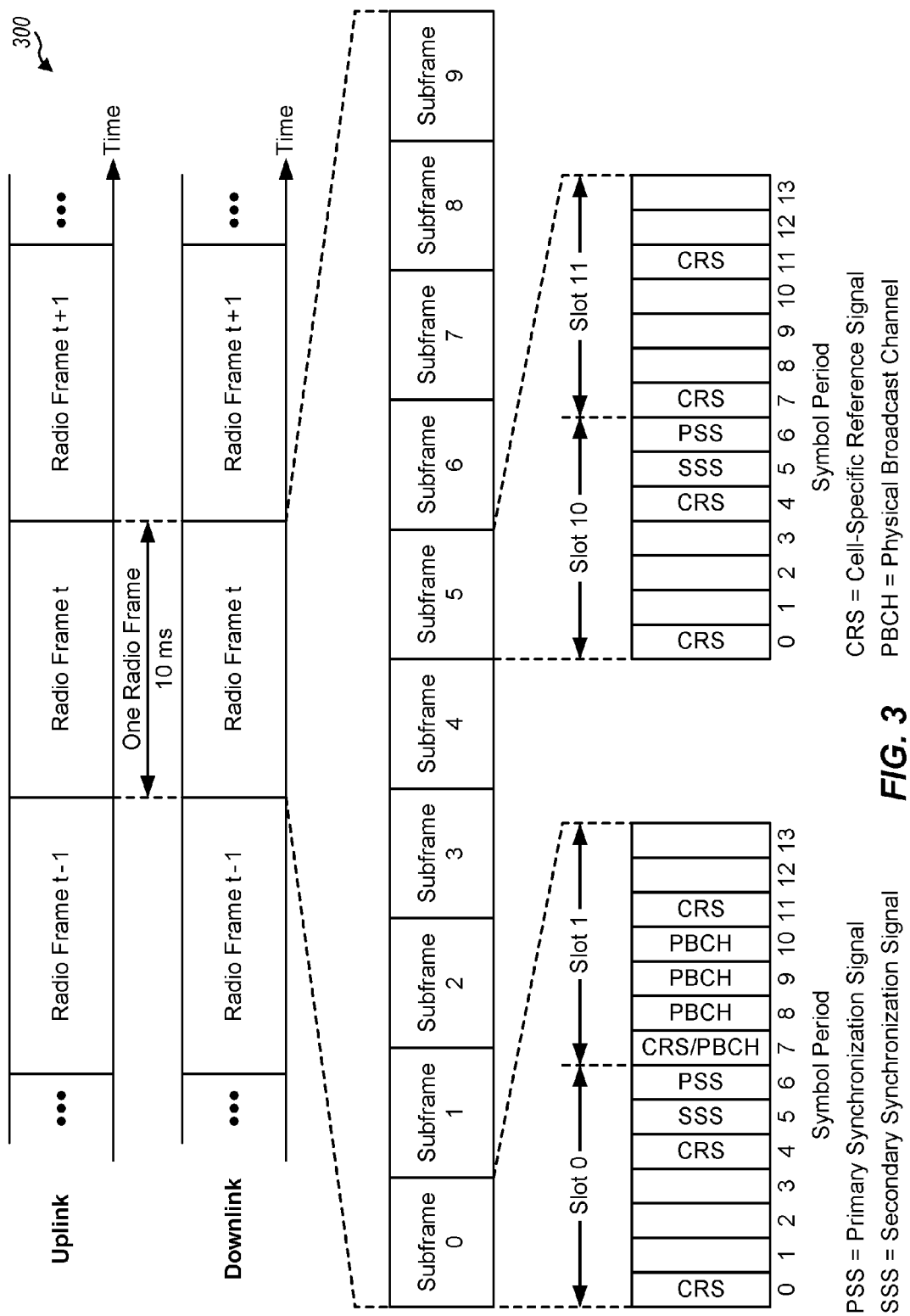
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe. The eNB may transmit control information/data on an enhanced physical downlink control channel (EPDCCH) in any symbol periods of a subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
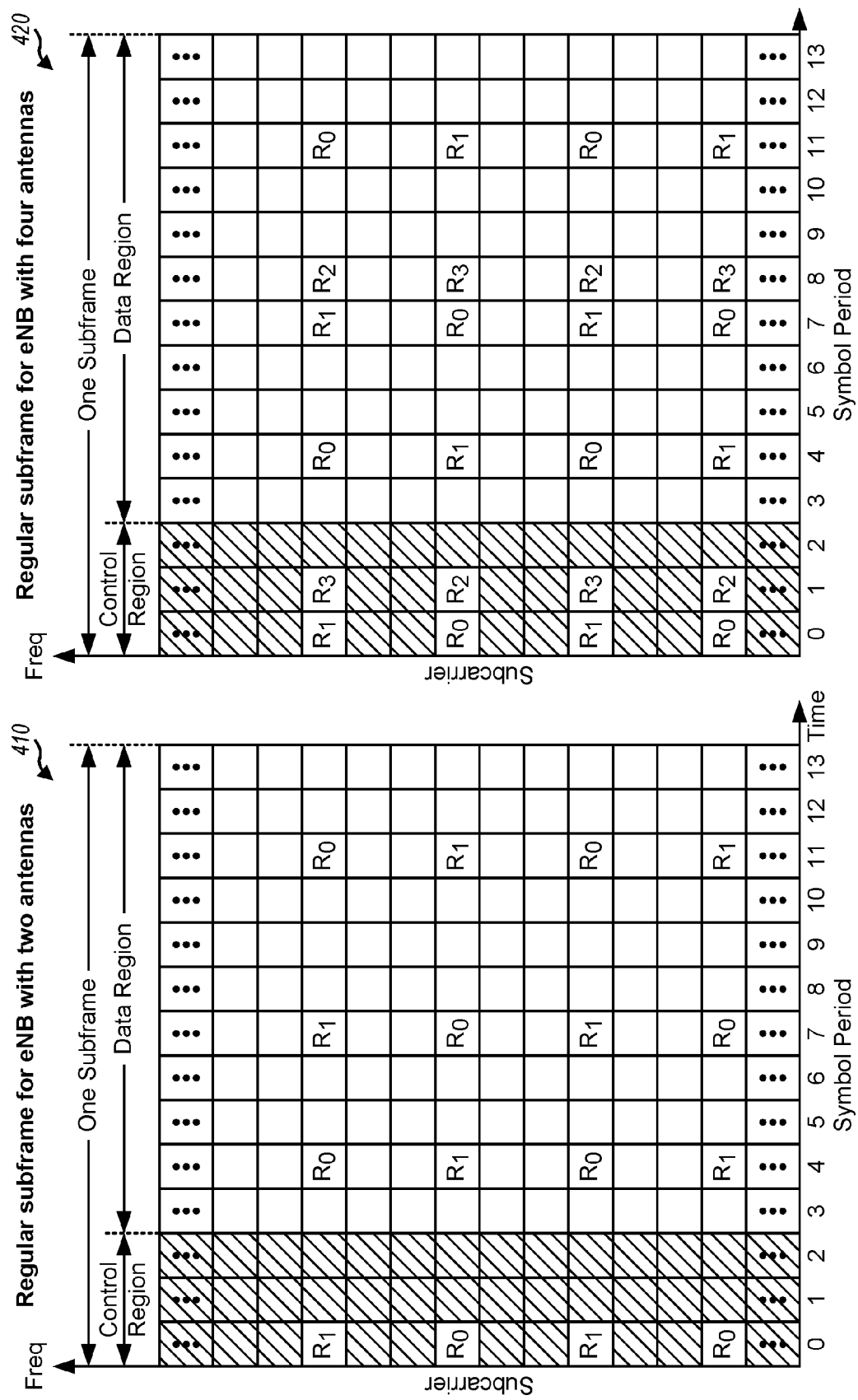
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Example MTC Coexistence within a Wideband System

Figure 5A:
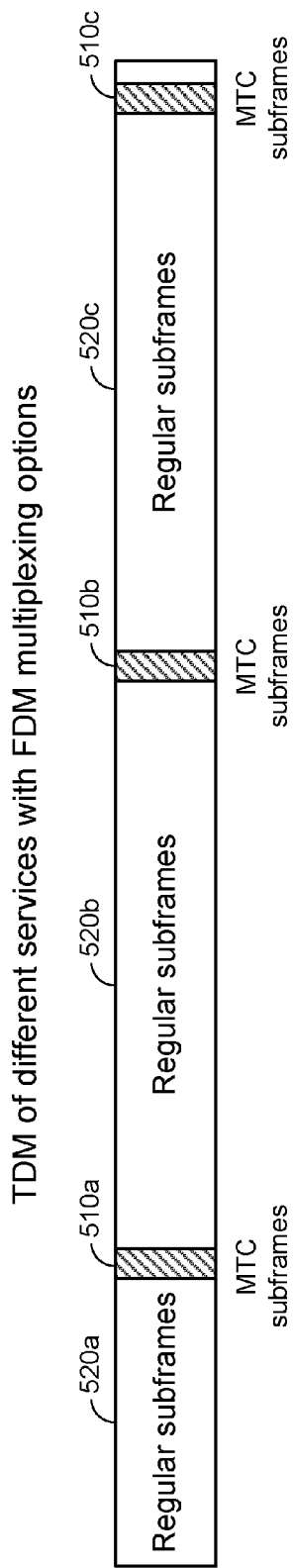
FIGS. 5A and 5B illustrate an example of MTC coexistence within a wideband system, such as LTE, in accordance with certain aspects of the present disclosure.
Figure 5B:
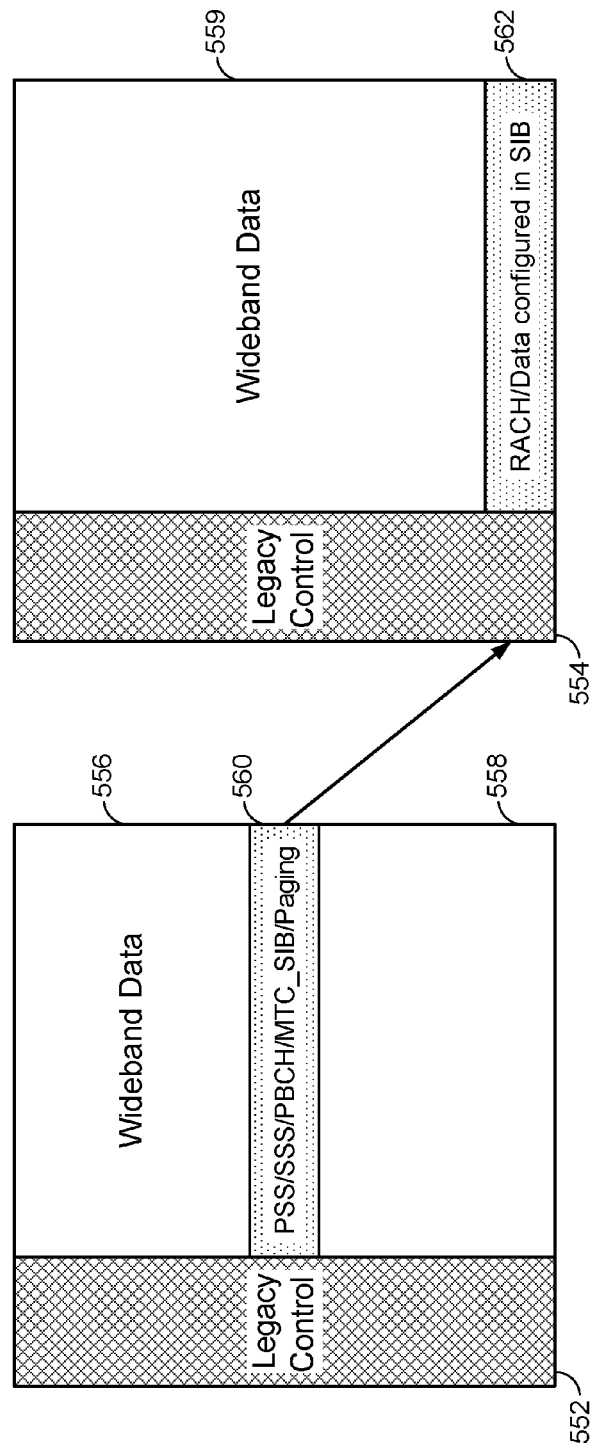

As mentioned above, MTC and/or eMTC operation may be supported in the wireless communication network (e.g., in coexistence with LTE or some other RAT). FIGS. 5A and 5B, for example, illustrate an example of how LC UEs in MTC operation may co-exist within a wideband system, such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, each LC UE in MTC operation may operate within one narrowband region (e.g., at 1.4 MHz or 6 RBs) at a time. However, LC UEs in MTC operation, at any given time, may re-tune to other narrowband regions in the wider system bandwidth. In some examples, multiple LC UEs may be served by the same narrowband region. In other examples, multiple LC UEs may be served by different narrowband regions (e.g., with each narrowband region spanning 6 RBs). In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 (e.g., spanning no more than 6 RBs of the wideband data) of a subframe 552 may be monitored by one or more LC UEs for either a PSS, SSS, PBCH, MTC signaling, or paging transmission from a BS in the wireless communication network. Regions 556 and 558 may be used by the BS for transmitting data to other UEs (e.g., non-LC UEs). As also shown in FIG. 5B, a second narrowband region 562 (e.g., also spanning no more than 6 RBs of the wideband data) of a subframe 554 may be used by a BS to transmit a RACH message or data, previously configured in signaling by the BS, to one or more of the LC UEs and/or other LC UEs. The LC UEs may have re-tuned to the second narrowband region to receive after monitoring the first narrowband region. Region 559 may be used by the BS for transmitting data to other UEs (e.g., non-LC UEs).

Although the examples described herein assume a narrowband of 6 RBs, those skilled in the art will recognize that the techniques presented herein may also be applied to different sizes of narrowband regions.

Example Narrowband Management for MTC

As mentioned above, in certain systems, e.g., such as LTE Rel-12, narrowband operation for MTC (e.g., eMTC) may be supported. A cell supporting narrowband operation for MTC may have different system bandwidths for downlink (DL) and uplink (UL) operations. A cell having different DL and UL system bandwidths (SBs) may organize the DL system bandwidth into narrowband regions in a manner different than the manner used to organize the UL system bandwidth into narrowband regions. Accordingly, aspects of the present disclosure provide techniques for organizing a DL system bandwidth and an UL system bandwidth into narrowband regions.

A cell supporting narrowband operation for MTC and legacy UEs may receive legacy PUCCH transmissions from the legacy UEs. Legacy PUCCH transmissions may be transmitted at either or both edges of a UL system bandwidth of a cell. Accordingly, aspects of the present disclosure provide techniques to reserve transmission resources included in an UL narrowband region for use by legacy PUCCH transmissions. Similar reservations may also be applied to a DL narrowband region for use by other legacy DL signals or channels.

A cell supporting narrowband operations for MTC may also support transmission of sounding reference signals (SRS). The current minimum defined bandwidth for transmission of SRS is four RBs. However, as mentioned above, the bandwidth of narrowband regions is six RBs. The fact that six RBs are not divisible by four RBs presents challenges in managing SRS transmissions using four RBs in six-RB based narrowband operations. Accordingly, aspects of the present disclosure provide techniques for assigning transmission resources for transmission of SRS in a cell supporting narrowband operations (e.g., for MTC).

A cell operating with FDD may have a DL system bandwidth that is of a different size than the UL system bandwidth of the cell. For example, a cell may perform DL operations in a system bandwidth of ten MHz and UL operations in a five MHz system bandwidth. To support MTC operations and MTC UEs, the cell may organize the DL system bandwidth and the UL system bandwidth into narrowband regions, or narrowband regions. An eNB or other BS controlling the cell may assign a DL narrowband region to a MTC UE for the MTC UE to monitor for signals from the eNB. Similarly, the eNB (or other BS) may assign a UL narrowband region to the MTC UE for the MTC to use when transmitting UL signals. In the example, the cell may organize the DL system bandwidth into eight DL narrowband regions while organizing the UL system bandwidth into four UL narrowband regions.

When a BS (e.g., an eNB or a cell) supports MTC UEs with the DL system bandwidth and UL system bandwidth of the cell organized into narrowband regions, the BS may establish a mapping between DL narrowband regions and UL narrowband regions, so that assigning a DL narrowband region to an MTC UE implies an assignment of a UL narrowband region to that MTC UE. Having a mapping allows the BS to simplify scheduling of resources in the cell, e.g., the BS can expect ACK/NAKs for transmissions on a DL narrowband region to an MTC UE on the corresponding UL narrowband region. Likewise, an MTC UE monitors for DL transmissions on the assigned DL narrowband region for the MTC UE and responds with transmissions on the corresponding UL narrowband region.

According to aspects of the present disclosure, a technique for mapping UL and DL narrowband regions by a BS is provided. A BS may determine a minimum size of the UL system bandwidth and the DL system bandwidth supported by the BS, determine a number of narrowband regions that can be organized in the determined size, and then organize both the DL system bandwidth and the UL system bandwidth in that number of narrowband regions. The BS may then map each DL narrowband region to one UL narrowband region. For example, a cell may perform DL operations in a system bandwidth of ten MHz and UL operations in a five MHz system bandwidth. In the example, the BS may determine that the minimum size of the UL system bandwidth and the DL system bandwidth is five MHz, and then determine that the BS can organize four narrowband regions in a five MHz system bandwidth. Still in the example, the BS may then organize four DL narrowband regions in the DL system bandwidth and four UL narrowband regions in the UL system bandwidth, and map each DL narrowband region to one UL narrowband region.

Figure 6:
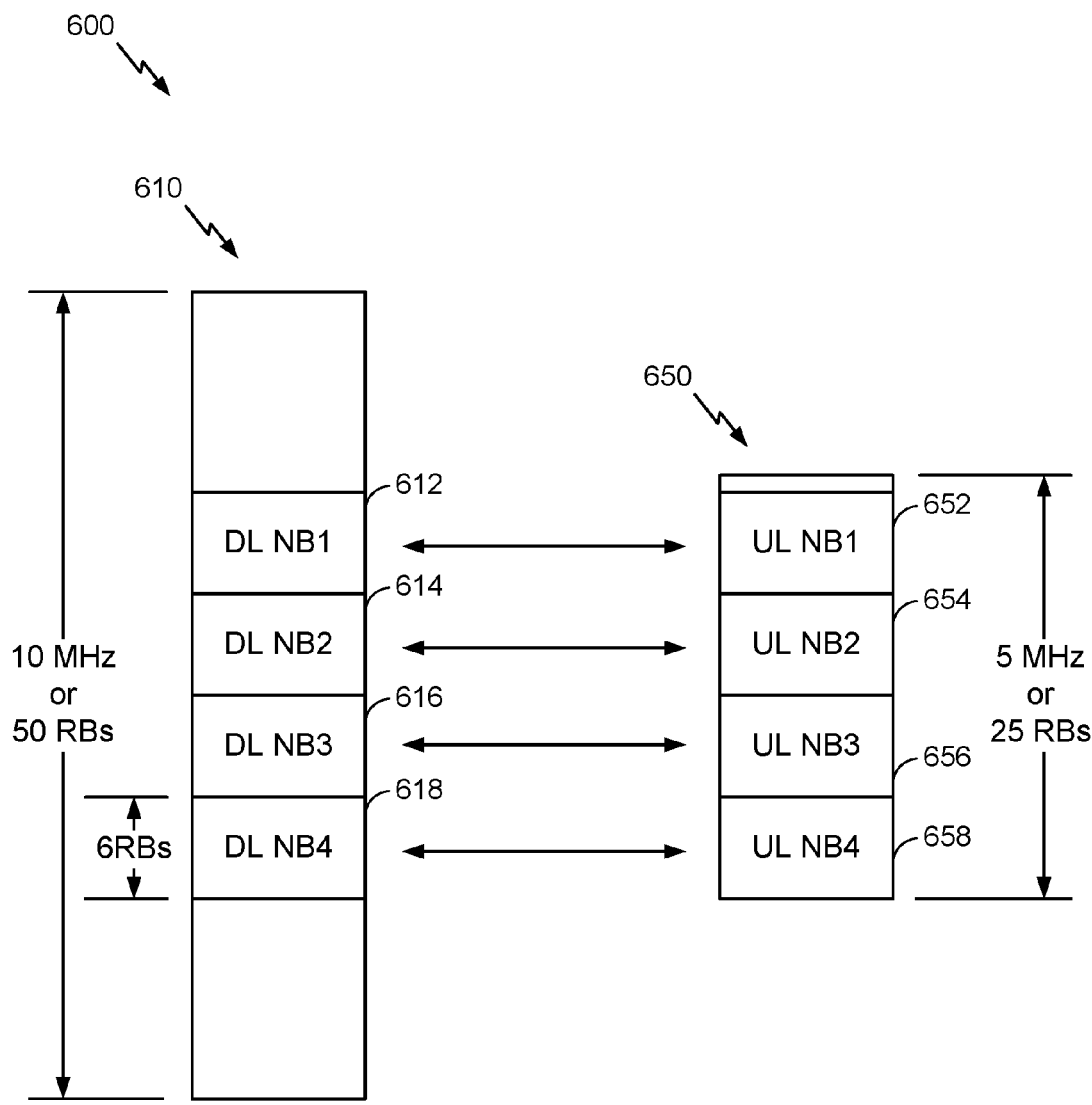
FIG. 6 illustrates an exemplary mapping of DL narrowband regions to UL narrowband regions, in accordance with certain aspects of the present disclosure.

FIG. 6 illustrates an exemplary mapping 600 of DL narrowband regions to UL narrowband regions, as described above. Such a mapping may be employed by eNB 110a in FIG. 1. While FIG. 6 shows the DL system bandwidth 610 and the UL system bandwidth 650 as apparently in the same frequency ranges, the DL system bandwidth and the UL system bandwidth are in different frequency ranges in a cell using FDD. DL system bandwidth 610 is ten MHz or fifty RBs wide, and UL system bandwidth 650 is five MHz or twenty-five RBs wide. A BS supporting MTC UEs while operating DL system bandwidth 610 and UL system bandwidth 650 may determine that the UL system bandwidth 650 is smaller than DL system bandwidth 610 (the 5 MHz size of UL system bandwidth 650 is the minimum size of the UL system bandwidth 650 and the DL system bandwidth 610). The BS may then determine that the BS can organize four narrowband regions 652, 654, 656, and 658 from the UL system bandwidth 650. The BS may then determine to organize four narrowband regions from the DL system bandwidth, and organize DL narrowband regions 612, 614, 616, and 618 from the DL system bandwidth. The BS may then map DL narrowband region 612 to UL narrowband region 652, DL narrowband region 614 to UL narrowband region 654, DL narrowband region 616 to UL narrowband region 656, and DL narrowband region 618 to UL narrowband region 658.

Example Ordered Physical Random Access Channel Resource Management

As mentioned above, LC MTC UEs were introduced in LTE Rel-12. Additional enhancements may be made in LTE Release 13 (Rel-13) to support MTC operations. For example, MTC UEs may be able to operate (e.g., monitor, transmit, and receive) in a narrowband region of 1.4 MHz or six RBs within wider system bandwidths (e.g., 1.4 MHz, 3 MHz, 5 MHz, 10 MHz, 15 MHz, 20 MHz). As a second example, base stations and MTC UEs may support coverage enhancements (CE) of up to 20 dB by some techniques, for example bundling. Coverage enhancement may also be referred to as coverage extension and range extension.

When a UE needs to connect with a cell to which the UE is not currently connected, the UE and the cell engage in an exchange of messages referred to as a random access channel (RACH) procedure. In an example RACH procedure, a UE transmits a physical random access channel (PRACH) signal (sometimes referred to as message 1 (Msg1) of a RACH procedure) in a set of transmission resources reserved for PRACH signals (sometimes referred to as a PRACH region), then the cell responds to the PRACH signal with a random access response (RAR) message (sometimes referred to as message 2 (Msg2) of a RACH procedure) carried on the downlink shared channel (DL-SCH). The UE responds to the RAR message with an RRC connection request message (sometimes referred to as message 3 (Msg3) of a RACH procedure), and the cell responds to the Msg3 with a contention resolution message (sometimes referred to as message 4 (Msg4) of a RACH procedure). The UE is then connected with the cell.

In current (e.g., LTE Rel-12) wireless technologies, a PRACH signal transmitted by an MTC device comprises a first group of 4 symbols using a first hopping pattern and a second group of 4 symbols using the first hopping pattern but offset from the first group by a random group hopping value.

Figure 7:
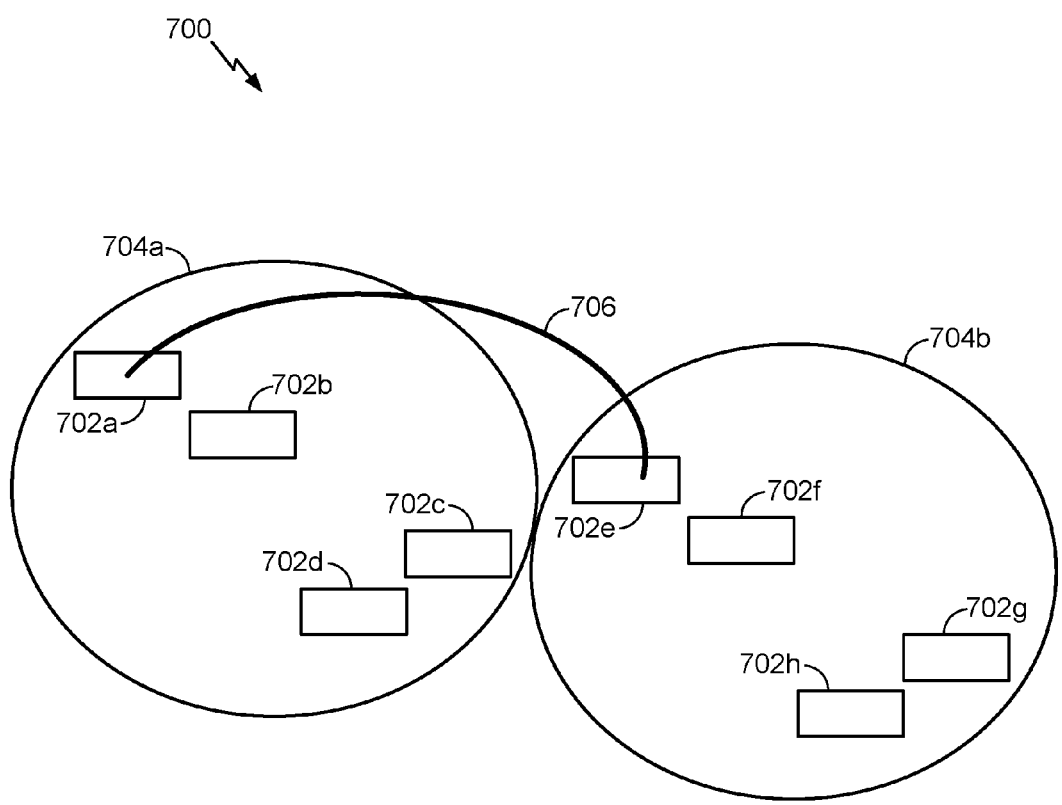
FIG. 7 schematically illustrates an exemplary physical random access channel (PRACH) signal, in accordance with certain aspects of the present disclosure.

FIG. 7 schematically illustrates an exemplary PRACH signal 700, in accordance with aspects of the present disclosure. Four symbols 702a-702d in a first group 704a are transmitted (e.g., by a UE), then a random group hopping is applied, and a second group 704b of symbols 702e-702h, with the same hopping pattern as in the first group, are transmitted (e.g., by the UE). The curve 706 illustrates the correspondence between symbol 702a in group 704a and symbol 702e in group 704b. Similarly, symbol 702b corresponds to symbol 702f, symbol 702c corresponds to symbol 702g, and symbol 702d corresponds to symbol 702h.

Tone spacing of PRACH signals (e.g., PRACH signal 700, shown in FIG. 7) may be 3.75 kHz. The symbols in a PRACH signal may use a cyclic prefix (CP) length of 66.7 microseconds (μs) or 266.7 μs, which are both different from CP lengths used for data transmission in an LTE system.

When a UE starts a random access procedure, the UE randomly selects one resource (e.g., a tone) from the resources reserved in the cell for PRACH signal transmission and transmits a PRACH signal using the resource. The UE may determine which resources in the cell are reserved for PRACH signals by receiving and decoding one or more system information blocks (SIBs) transmitted by the cell.

Figure 8:
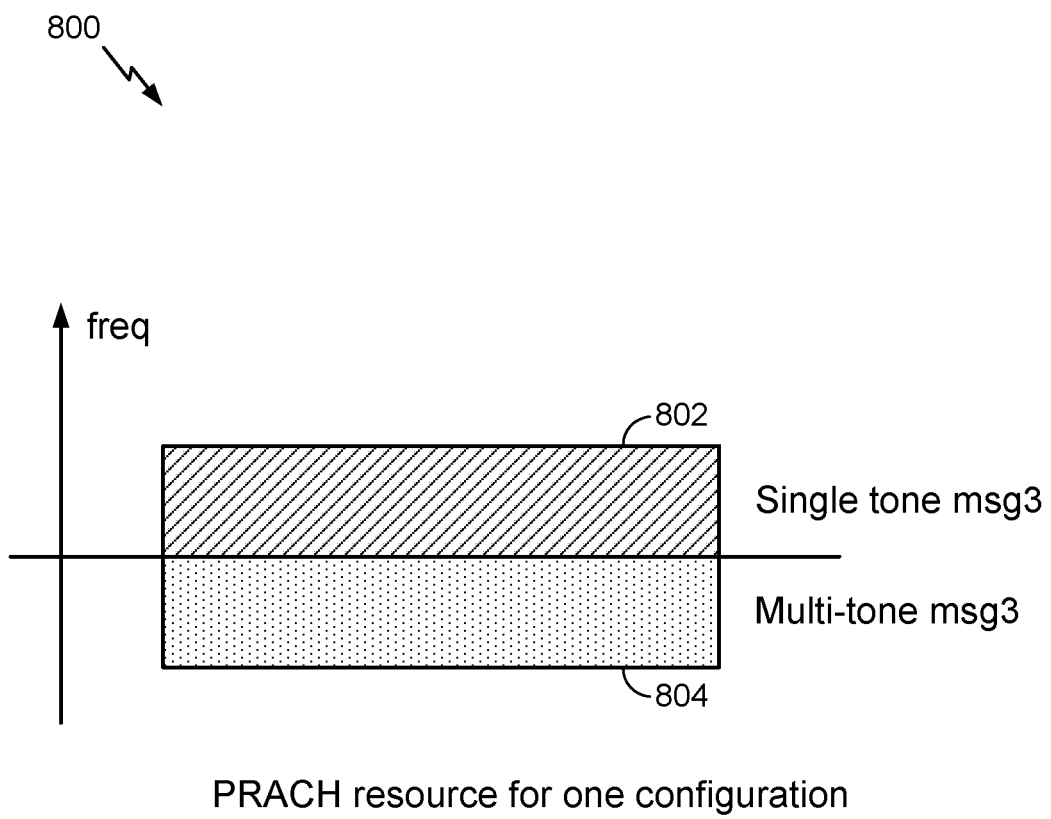
FIG. 8 schematically illustrates a set of resources reserved for PRACH signals, in accordance with certain aspects of the present disclosure.

FIG. 8 is a schematic illustration of a set of resources 800 reserved (e.g., by a BS, by a cell) for PRACH signals (e.g., a PRACH region), in accordance with aspects of the present disclosure. The frequency region 802 is a set of tones to be used by a UE that intends Msg3 of the RACH procedure to be a single tone message. For example, an MTC UE may select resources from frequency region 802 when transmitting Msg1 of a RACH procedure so that the MTC UE can transmit a single tone Msg3 after receiving Msg2 from a cell. The frequency region 804 is a set of tones to be used by a UE that intends Msg3 of the RACH procedure to be a multi-tone message. A cell may select resources reserved for PRACH signals from a wider system bandwidth, and the cell may transmit indications of the resources reserved for PRACH signals in one or more SIBs.

A UE may sometimes be in connected mode with a serving cell, but lose synchronization (e.g., uplink synchronization) with the serving cell of the UE. When the UE loses synchronization with the serving cell, a serving BS (e.g., a serving eNB) may request the UE to transmit a PRACH signal by sending a PDCCH to the UE indicating the UE should transmit a PRACH signal. In current (e.g. LTE Rel-12) wireless technologies, the UE may randomly select a resource for the PRACH signal from resources reserved for PRACH signals by the serving cell. Because of the randomness of the selection, the commanded PRACH signal (i.e., the PRACH signal transmitted by the UE on the randomly selected resources) might collide with PRACH signals from other UEs (e.g., UEs connecting with the eNB, other UEs that were commanded to transmit PRACH signals).

A UE that has an active receiver (e.g., the receiver is not powered down) typically monitors for PDCCH (e.g., EPDCCH, MPDCCH) in one or more search spaces. The UE typically monitors at least one common search space (CSS) and may be configured to monitor a UE-specific search space (UESS). A search space includes a set of groups of contiguous control channel elements (CCEs). The UE uses an identifier (e.g., a radio network temporary identifier (RNTI)) of the UE in determining if any one of the groups in the search space contains a PDCCH directed at the UE. Monitoring for PDCCHs is further described in 3GPP TS 36.213 "Evolved Universal Terrestrial Radio Access (E-UTRA); Physical layer procedures," which is publicly available and hereby incorporated by reference.

According to aspects of the present disclosure, a BS (e.g., an eNB) may assign a specific resource for transmission of a PRACH signal to a UE that the BS is commanding to transmit a PRACH signal. For example, an eNB serving a UE may assign a tone to the UE for the UE to use in transmitting a PRACH signal when the eNB determines to command (e.g., direct) the UE to transmit a PRACH signal (e.g., when the UE has lost synchronization with a cell, served by the eNB, serving the UE).

According to aspects of the present disclosure, a BS (e.g., an eNB) may command a UE to use a particular resource in a PRACH region configured (e.g., reserved) by the BS. When doing so, the BS may send signaling indicating that other UEs are not to use the particular resource for transmitting PRACH signals.

According to aspects of the present disclosure, a BS (e.g., an eNB) may command a UE to use resources in a data region (e.g., the wideband data regions 556, 558, 559 shown in FIG. 5B) for transmitting a PRACH signal. When transmitting a PRACH signal in a data region, the different CP and tone spacing (e.g., as mentioned above) of the PRACH signal from data signals (e.g., data signals transmitted by other UEs in the cell) may lead to interference between the PRACH signal and the data signals. In addition, frequency hopping within groups and random group hopping (as mentioned above with reference to FIG. 7) may lead to transmission resources being wasted (e.g., not used for data transmission or PRACH signals).

According to aspects of the present disclosure, a cell (e.g., a BS serving the cell) may split the set of resources reserved for PRACH signals into three regions, with a first region reserved for UEs that intend Msg3 to be a single tone message, a second region reserved for UEs that intend Msg3 to be a multi-tone message, and a third region for UEs that are transmitting scheduled PRACH signals (e.g., PRACH signals transmitted in response to a command from the eNB, such as a PDCCH).

Figure 9:
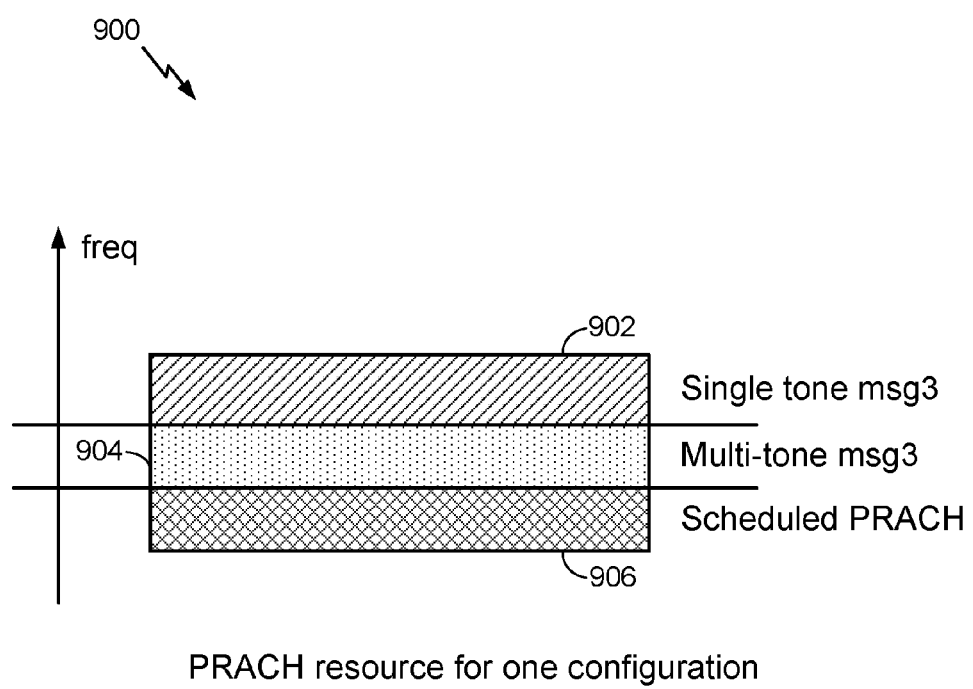
FIG. 9 schematically illustrates a set of resources reserved for PRACH signals, in accordance with certain aspects of the present disclosure.

FIG. 9 is a schematic illustration of a set of resources 900 reserved for PRACH signals (e.g., a PRACH region) divided into three regions, as mentioned above. The frequency region 902 is a set of tones to be used by a UE transmitting an unscheduled PRACH signal that intends Msg3 of the RACH procedure to be a single tone message. The frequency region 904 is a set of tones to be used by a UE transmitting an unscheduled PRACH signal that intends Msg3 of the RACH procedure to be a multi-tone message. The frequency region 906 is a set of tones to be used by a UE transmitting a scheduled PRACH signal.

According to aspects of the present disclosure, a BS (e.g., an eNB) may transmit (e.g., in a SIB) an additional parameter to indicate a region of transmission resources reserved for scheduled PRACH signals. For example, a BS may transmit an indication of a first region of transmission resources reserved for PRACH signals and the additional parameter may be an offset from one of the boundaries of the first region, with the offset indicating a second region, within the first region, for scheduled PRACH signals.

According to aspects of the present disclosure, a BS (e.g., an eNB) may configure a semi-static resource split for a cell, with a region of transmission resources reserved for scheduled PRACH signals in response to PDCCH orders. The resource split may be referred to as semi-static, because the resource split is effective, for example, for the cell and/or the BS until reconfigured by the BS. A PDCCH ordered PRACH signal is a relatively rare event, and a semi-statically allocated set of resources for scheduled PRACH signals may frequently go unused, possibly resulting in a waste of transmission resources.

In aspects of the present disclosure, a BS (e.g., an eNB) may update (e.g., change) a semi-static resource split for a cell on a periodic basis and transmit (e.g., in a SIB or MIB) signaling regarding the updated resource split. For example, a BS may determine a semi-static resource split for a cell and transmit an indication of that resource split. In the example, the BS may also determine a period for updating the resource split and transmit an indication of that period. Still in the example, after the period has passed, the BS may determine whether to update the semi-static resource split, and, if the determination is to update the resource split, the BS may transmit an indication of the new (e.g., changed) resource split. A UE in the cell may activate a receiver based on the period indicated by the BS in order to receive updates of the semi-static resource split, if there are any.

According to aspects of the present disclosure, a BS (e.g., an eNB) may configure a dynamic resource split, with a region of transmission resources reserved for scheduled PRACH signals at or near times when the BS is going to send PDCCHs commanding one or more UEs to transmit scheduled PRACH signals. The resource split may be referred to as dynamic, because the resource split is changed in response to the BS detecting that the one or more UEs should transmit scheduled PRACH signals (e.g., the UEs have lost synchronization) and the change in the resource split is effective for a predetermined period of time. When an eNB intends to command a UE to transmit a scheduled PRACH signal, the eNB may dynamically change the configuration of the PRACH resources and transmit signaling (e.g., in SIBs) containing PRACH resource changes for a period (e.g., four ms).

Figure 10:
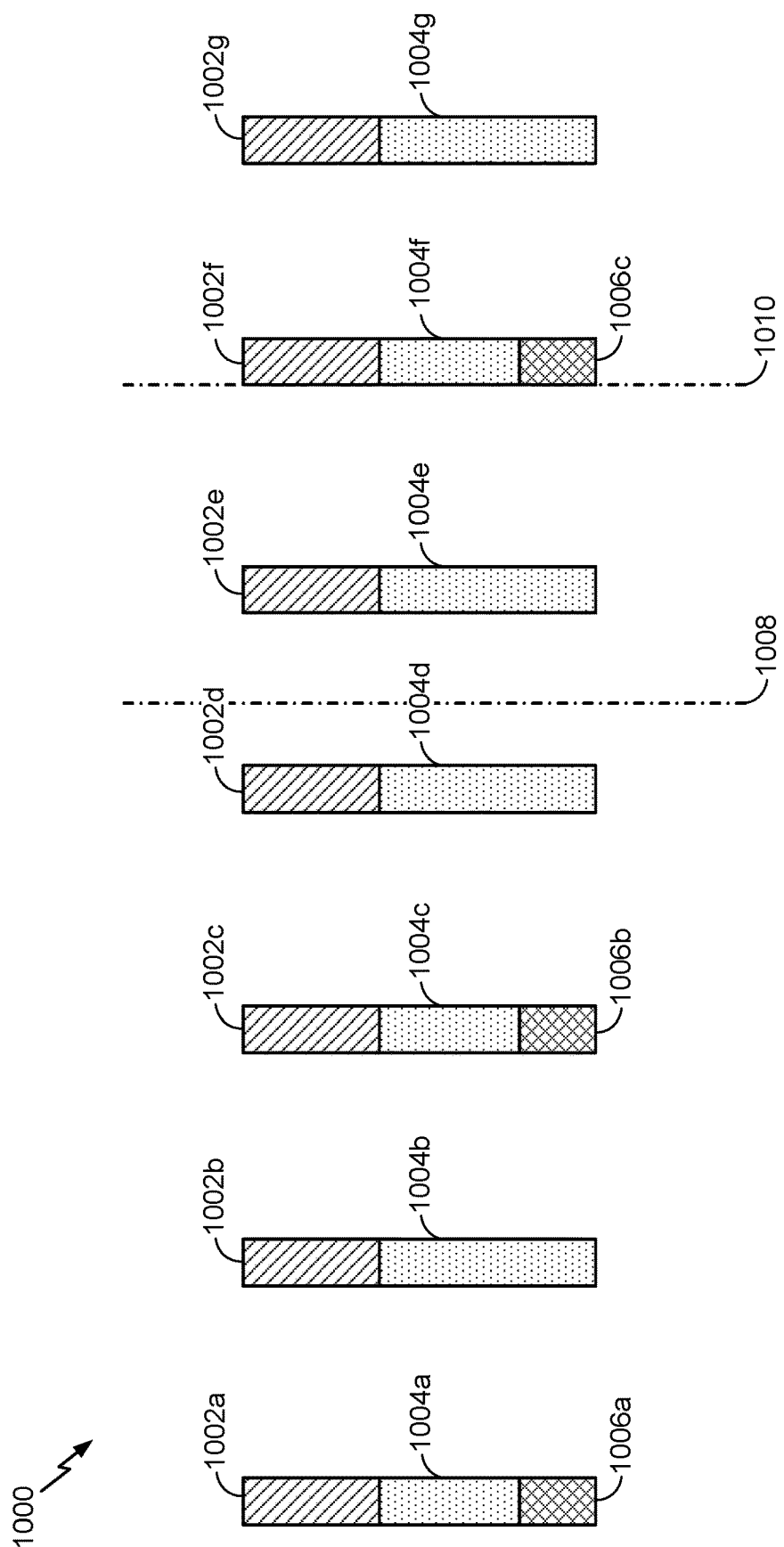
FIG. 10 schematically illustrates a set of resources reserved for PRACH signals, in accordance with certain aspects of the present disclosure.

FIG. 10 is a schematic illustration of a set of resources 1000 reserved for PRACH signals (e.g., a PRACH region) divided into three regions and dynamically updated over time, as mentioned above. The frequency regions 1002a-1002g are a set of tones at various times to be used by a UE transmitting an unscheduled PRACH signal and intending Msg3 of the RACH procedure to be a single tone message. The frequency regions 1004a-1004g are a set of tones at the various times to be used by a UE transmitting an unscheduled PRACH signal and intending Msg3 of the RACH procedure to be a multi-tone message. The frequency regions 1006a-1006c are a set of tones that are dynamically configured by a BS to be used by a UE transmitting a scheduled PRACH signal at indicated times of the various times.

According to aspects of the present disclosure, a BS (e.g., an eNB) may change the resources reserved for PRACH signals at a limited set of times, e.g., at certain system frame numbers (SFN). The BS may signal the limited set of times by for example, including indications of the times in one or more SIBs. A UE may receive the signaling and determine the set of times that the UE may change the resources reserved for PRACH signals. Additionally or alternatively, the set of times may be determined, by the BS and by UEs, based on a standard and/or specification.

According to aspects of the present disclosure, if a first random access attempt by a UE fails (e.g., the eNB did not respond to the PRACH signal from the UE), the UE may check SIB contents (e.g., for changes to resources reserved for PRACH signals) before transmitting a second PRACH attempt, if that attempt is after a possible SIB changing of resources reserved for PRACH signals. For example, a UE sends a first PRACH signal in a random access attempt to a BS, and the random access attempt fails. In the example, the UE has information regarding a set of times that the BS may change the resources reserved for PRACH signals. Still in the example, if one of the set of times occurs before the UE makes a second random access attempt, then the UE may check SIB contents received since the first random access attempt to determine if the BS has changed the resources reserved for PRACH signals. Still in the example, if the BS has changed the resources reserved for PRACH signals, then the UE may determine resources to use for sending a PRACH signal for a second random access attempt, based on the SIB contents.

According to aspects of the present disclosure, a resource split for PDCCH-ordered PRACH signals may only happen at certain times, e.g., every 1024 frames. According to these aspects, an eNB may transmit the semi-static time information in signaling, e.g., in one or more SIBs. The eNB may send a PDCCH command to a UE to cause the UE to transmit a PRACH signal whenever the eNB determines that the UE needs to transmit a PRACH signal, and the UE may wait to transmit the scheduled PRACH until after a change in resources reserved for PRACH signals occurs and makes resources available for scheduled PRACH signals, which may be many subframes later. For example, a BS may send a PDCCH to a UE commanding the UE to send a PRACH signal at time 1008, shown in FIG. 10, and the UE may wait until time 1010 to transmit the commanded PRACH signal, because the resources reserved for PRACH signals change at time 1010, and the UE can use the resources 1006c for transmitting the commanded PRACH signal.

Figure 11:
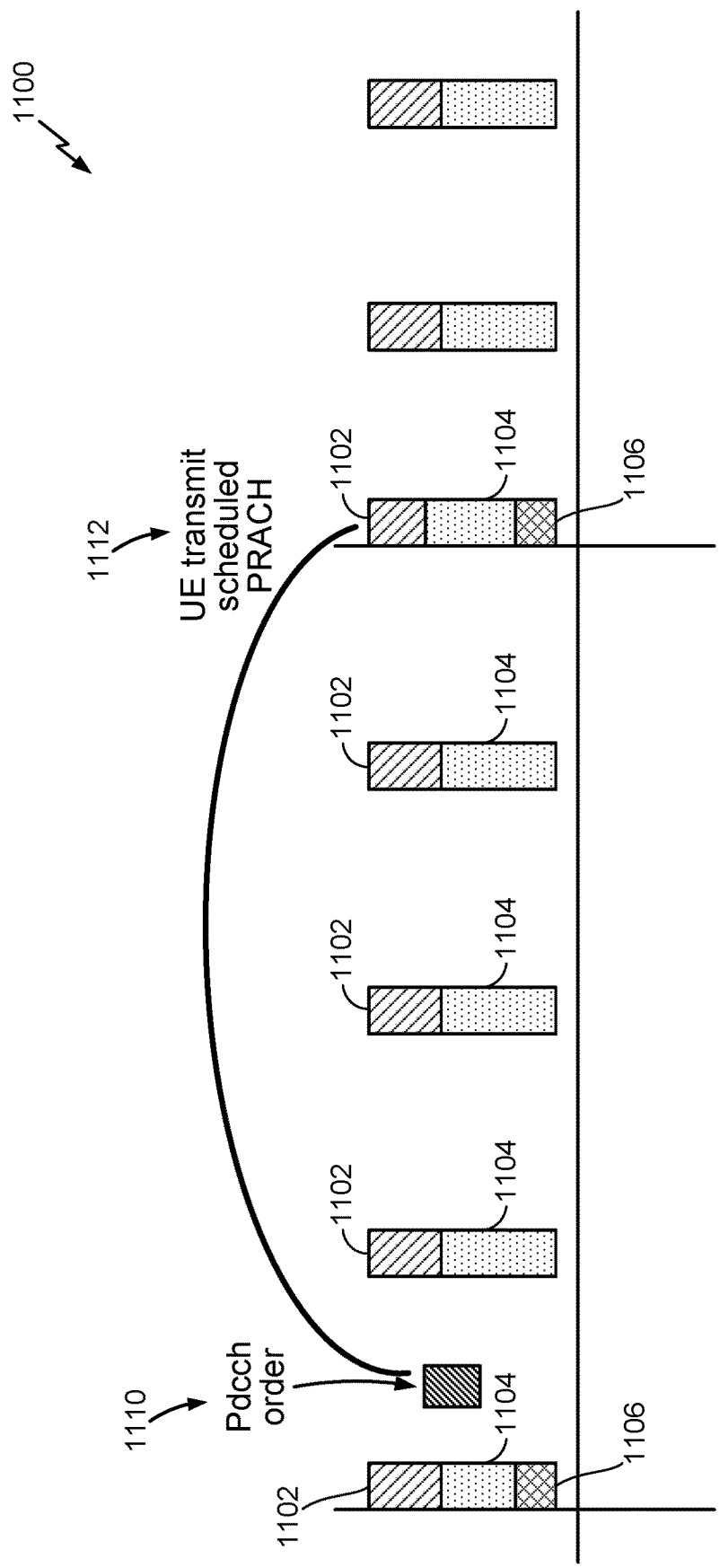
FIG. 11 schematically illustrates a set of resources reserved for PRACH signals, in accordance with certain aspects of the present disclosure.

FIG. 11 is a schematic illustration of an exemplary timeline 1100 showing a set of resources reserved for PRACH signals (e.g., a PRACH region) divided into three regions at certain times by a BS (e.g., eNB 110, shown in FIG. 1), as mentioned above. The frequency regions 1102 are a set of tones at various times to be used by a UE (e.g., UE 120a, shown in FIG. 1) transmitting an unscheduled PRACH signal to the BS that intends Msg3 of the RACH procedure to be a single tone message. The frequency regions 1104 are a set of tones to be used by a UE transmitting an unscheduled PRACH signal to the BS that intends Msg3 of the RACH procedure to be a multi-tone message. The frequency regions 1106 are a set of tones to be used by a UE transmitting a scheduled PRACH signal at the indicated times. In an example, at time 1110, the eNB transmits a PDCCH requesting the UE to transmit a scheduled PRACH signal. Because, in the exemplary timeline, there are no resources allocated for scheduled PRACH signals until time 1112, the UE does not transmit the scheduled PRACH signal, requested in the PDCCH at time 1110, until time 1112.

According to aspects of the present disclosure, when a number of UEs in need of a PDCCH order to transmit a PRACH signal is more than the resources reserved for scheduled PRACH signals can accommodate, a BS (e.g., an eNB) may not transmit PDCCH orders for all of the UEs needing PDCCH orders to transmit PRACH signals, and the BS may let the remaining UEs transmit PRACH signals in randomly selected resources. That is, the BS may determine a first group of UEs and a second group of UEs need to send PRACH signals (e.g., the UEs have lost uplink synchronization) and the BS may send PDCCH orders to the first group of UEs, causing the first group of UEs to transmit PRACH signals in resources reserved for scheduled PRACH signals (e.g., resources 1106, shown in FIG. 11), and the BS may not send commands to send PRACH signals to the second group of UEs. Each UE in the second group may send a PRACH signal on randomly selected resources when the UE determines that the UE needs to send a PRACH signal (e.g., the UE determines that the UE has lost synchronization with the BS).

According to aspects of the present disclosure, when a number of UEs in need of a PDCCH order to transmit a PRACH signal is more than the resources reserved for scheduled PRACH signals can accommodate, a BS (e.g., an eNB) may transmit PDCCH orders for the remaining UEs indicating those UEs should use random PRACH resources and not the scheduled PRACH resources. That is, the BS may determine a first group of UEs and a second group of UEs need to send PRACH signals (e.g., the UEs have lost uplink synchronization) and the BS may send PDCCH orders according to aspects of the present disclosure that cause UEs in the first group to send PRACH signals in resources reserved for scheduled PRACH signals, and the BS may send PDCCH orders according to previously known techniques to UEs in the second group, causing each UE in the second group to send a PRACH signal on resources randomly selected by the UE.

According to aspects of the present disclosure, a BS (e.g., an eNB) may utilize a portion of the data region of the system bandwidth for scheduled PRACH signals. That is, a BS may reserve resources for scheduled PRACH signals in a data region of the system bandwidth instead of in the PRACH region. Additionally or alternatively, a BS may include an indication, of resources in the data region of the system bandwidth to be used by a UE when transmitting a PRACH signal, in a PDCCH ordering the UE to transmit a scheduled PRACH signal.

Figure 12:
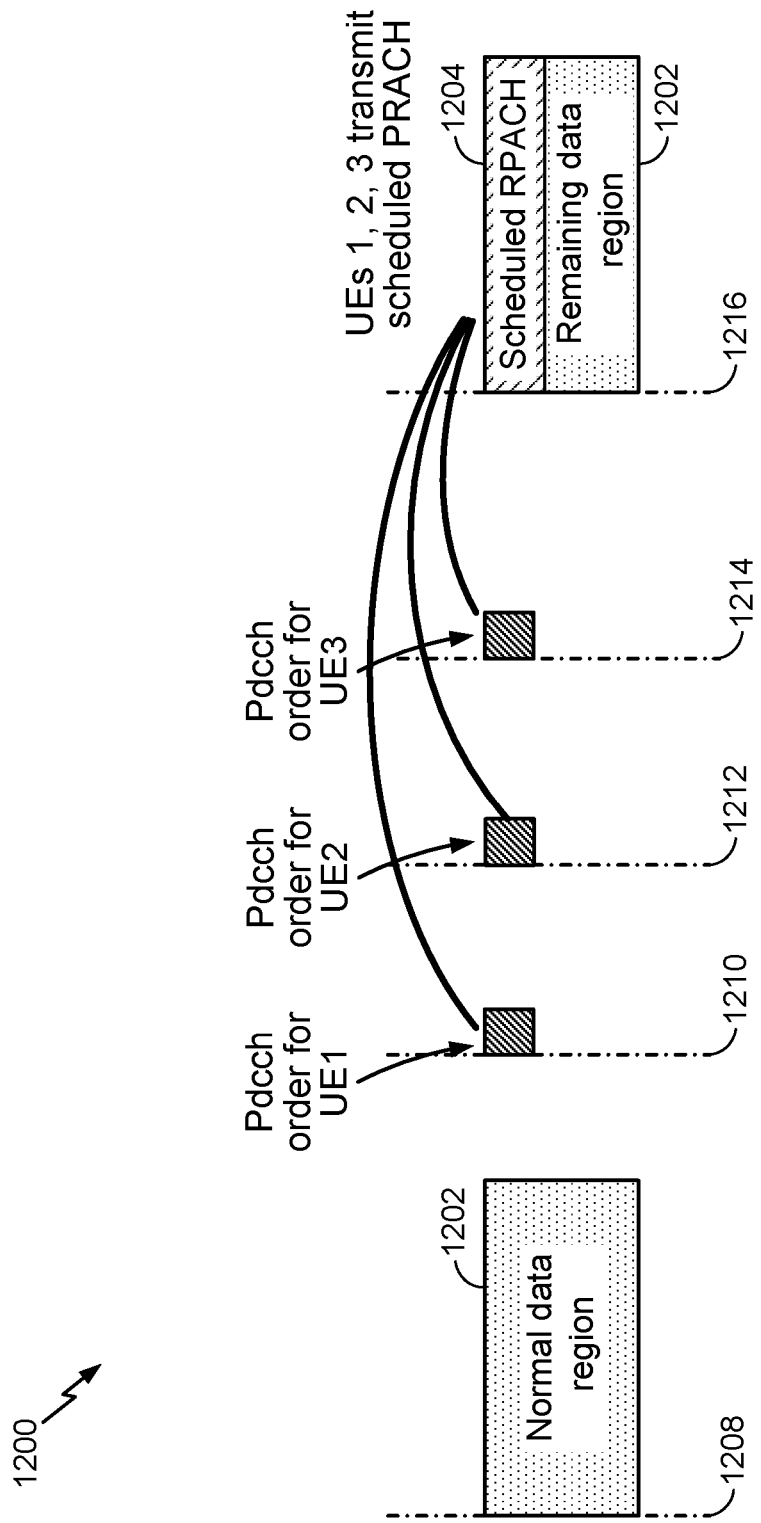
FIG. 12 schematically illustrates a set of resources reserved for data transmissions and scheduled PRACH signals, in accordance with certain aspects of the present disclosure.

FIG. 12 is an exemplary timeline 1200 schematically illustrating a set of resources reserved for data transmissions and scheduled PRACH signals divided into two regions by a BS (e.g., eNB 110 shown in FIG. 1) at certain times, as mentioned above. The frequency regions 1202 are sets of tones at various times to be used for data transmissions. The frequency region 1204 is a set of tones to be used by UEs transmitting a scheduled PRACH signal at the indicated time. At time 1210, the BS transmits a PDCCH requesting a UE (e.g., UE 120a shown in FIG. 1), UE1, to transmit a scheduled PRACH signal. Similarly, at times 1212 and 1214, the BS transmits PDCCHs requesting other UEs, UE2 and UE3, transmit scheduled PRACH signals. Because there are no resources allocated for scheduled PRACH signals until time 1216, the UEs, UE1, UE2, and UE3, do not transmit the scheduled PRACH signals until time 1216.

According to aspects of the present disclosure, UEs may disable random group hopping (e.g., the frequency hopping shown between group 704a and 704b in FIG. 7) when transmitting scheduled PRACH signals in a data region repurposed for scheduled PRACH signals, such as region 1204, shown in FIG. 12. Disabling random group hopping may avoid wasting of some transmission resources.

According to aspects of the present disclosure, a BS (e.g., an eNB) may postpone transmitting PDCCHs commanding scheduled PRACH signals or transmit those PDCCHs immediately, but allow UE(s) to postpone transmission of PRACH signals until the UEs are grouped to transmit scheduled PRACH signals together in time. Postponing scheduled PRACH signals and grouping UEs may avoid wasting of some transmission resources.

According to aspects of the present disclosure, a cell may allocate some tones as guard tones between a region for scheduled PRACH signals and a remaining data region. Allocating tones as guard tones may reduce interference between data transmissions and scheduled PRACH signals. This interference may, for example, be caused by the CP differences between the data transmissions and the scheduled PRACH signals.

According to aspects of the present disclosure, an eNB splitting a data region into resources for data and resources for scheduled PRACH signals may dynamically split the data region. An eNB dynamically splitting a data region into resources for data and resources for scheduled PRACH signals may add to a PDCCH ordering a scheduled PRACH signal a time for transmission of the scheduled PRACH signal.

According to aspects of the present disclosure, a BS (e.g., an eNB) splitting a data region into resources for data and resources for scheduled PRACH signals (e.g., regions 1202 and 1204, shown in FIG. 12) may perform the resource split semi-statically at only certain times (e.g., certain subframes). A BS semi-statically splitting a data region into resources for data and resources for scheduled PRACH signals may transmit an indication of the semi-statically selected times in signaling from the BS, e.g., in SIBs. A split may be referred to as semi-static, because the split is configured to occur at known times and to repeat over time until the BS announces (e.g., in a SIB) a change (e.g., a change in times, a change in repetition interval, a change in the selected resources) to the split.

Figure 13:
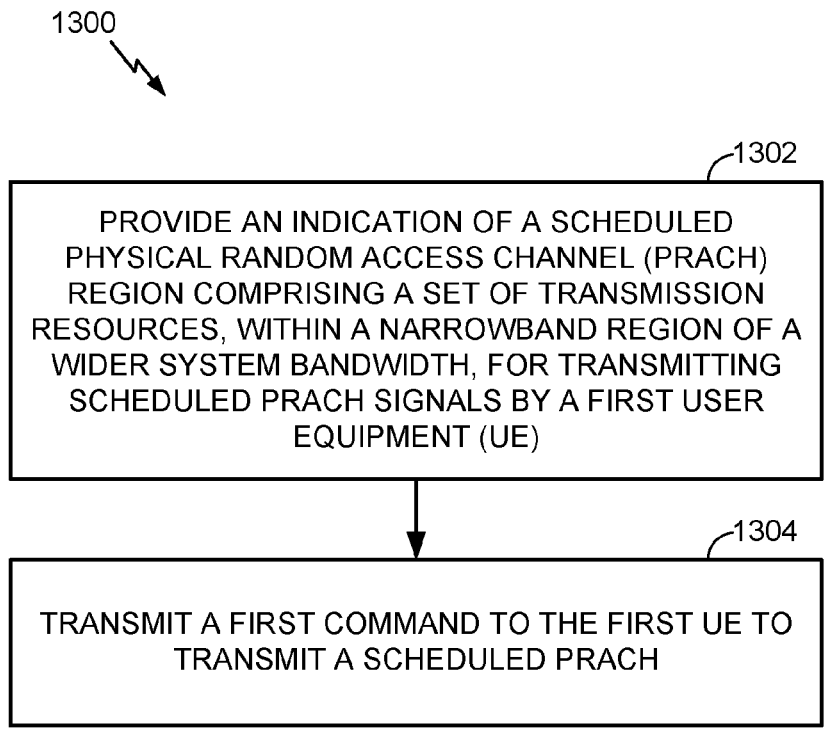
FIG. 13 illustrates exemplary operations for wireless communications that may be performed by a BS, in accordance with certain aspects of the present disclosure.

FIG. 13 illustrates example operation 1300 for wireless communications that may be performed by a BS (e.g., eNodeB 110a in FIG. 1), according to aspects of the present disclosure. The operation 1300 may be performed by a BS to command a UE to transmit a scheduled PRACH signal.

Operation 1300 begins at block 1302, wherein the BS provides an indication of a scheduled physical random access channel (PRACH) region comprising a set of transmission resources, within a narrowband region of a wider system bandwidth, for transmitting scheduled PRACH signals by a first user equipment (UE).

Operation 1300 continues at block 1304, wherein the BS transmits a first command to the first UE to transmit a scheduled PRACH.

Figure 14:
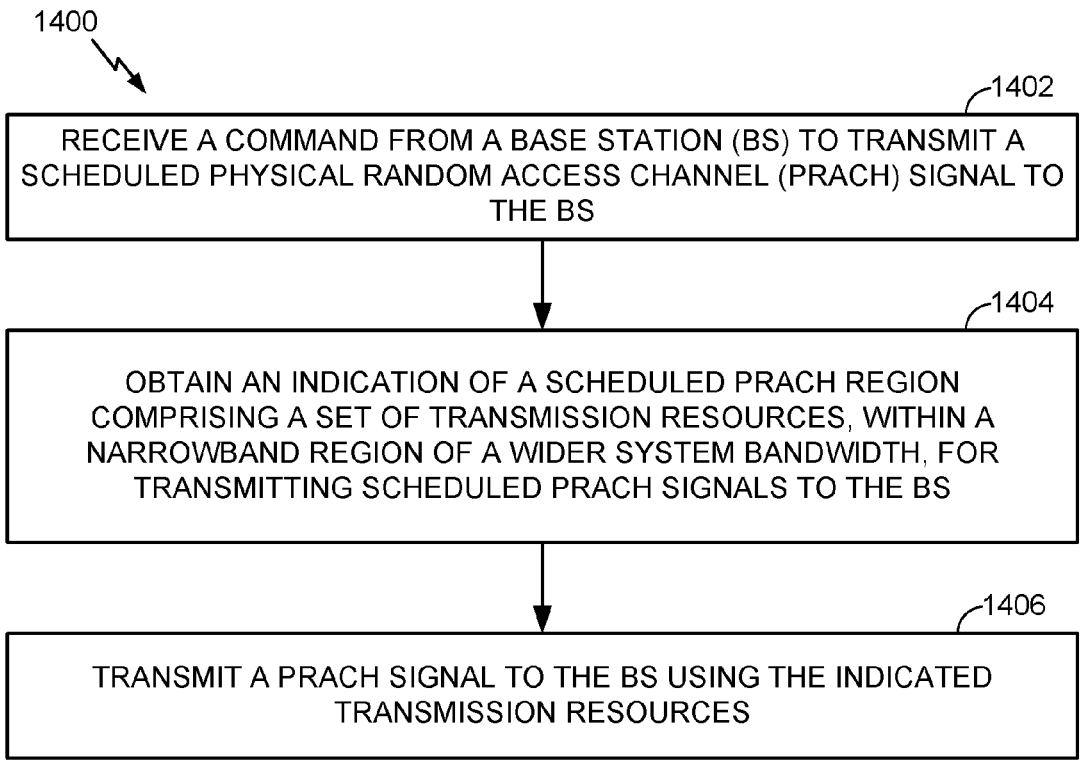
FIG. 14 illustrates exemplary operations for wireless communications that may be performed by a UE, in accordance with certain aspects of the present disclosure.

FIG. 14 illustrates example operation 1400 for wireless communications that may be performed by a UE (e.g., UE 120a in FIG. 1), according to aspects of the present disclosure. The operation 1400 may be performed by a UE to transmit a scheduled PRACH signal, for example. The operation 1400 may be considered complementary to the operation 1300 in FIG. 13 described above.

Operation 1400 begins at block 1402, wherein the UE receives a command from a base station (BS) to transmit a scheduled physical random access channel (PRACH) signal to the BS.

Operation 1400 continues at block 1404, wherein the UE obtains an indication of a scheduled PRACH region comprising a set of transmission resources, within a narrowband region of a wider system bandwidth, for transmitting scheduled PRACH signals to the BS.

At block 1406, the UE transmits a PRACH signal to the BS using the indicated transmission resources.

Figure 13A:
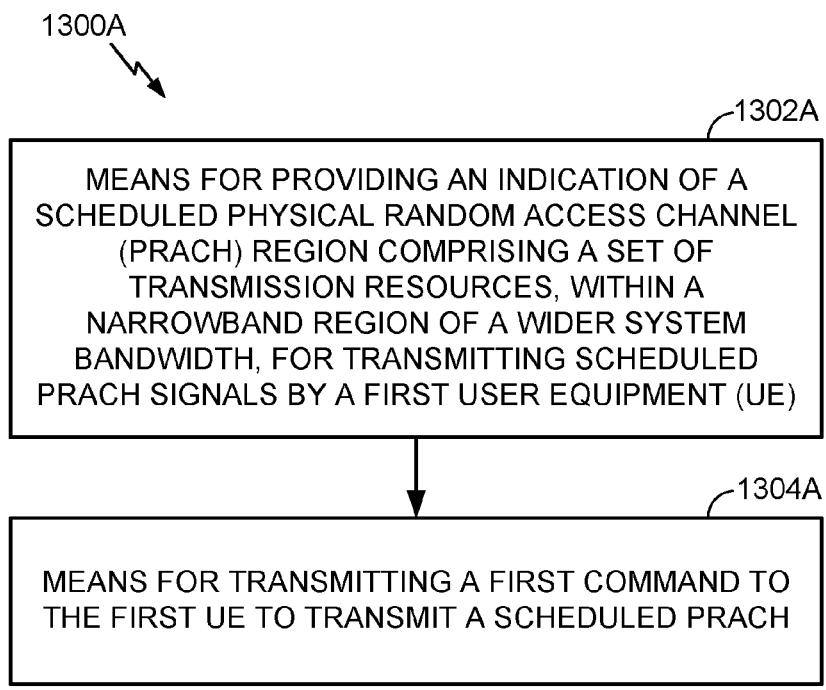
FIG. 13A illustrates example means capable of performing the operations shown in FIG. 13.
Figure 14A:
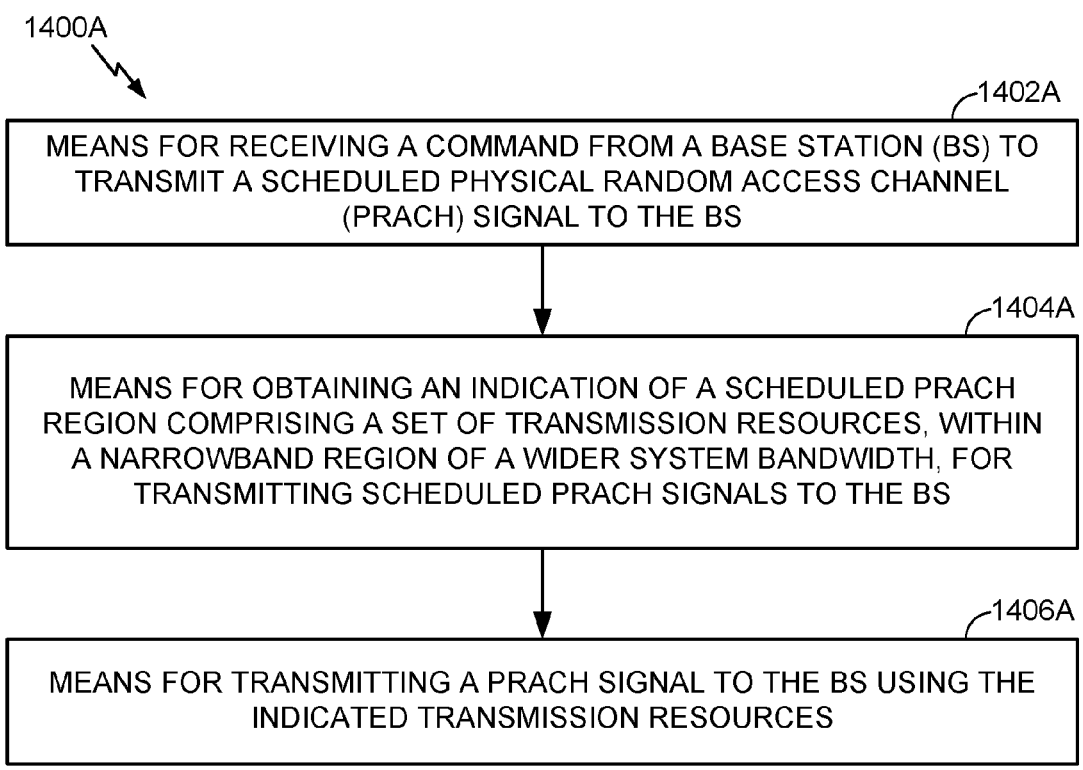
FIG. 14A illustrates example means capable of performing the operations shown in FIG. 14.

The steps of a method or algorithm described in connection with the disclosure herein may be embodied directly in hardware, in a software module executed by a processor or processing system, or combinations thereof. A software module may reside in RAM memory, flash memory, ROM memory, EPROM memory, EEPROM memory, PCM (phase change memory), registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor, processing system, and/or the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering. For example, operations 1300 illustrated in FIG. 13 correspond to means 1300A illustrated in FIG. 13A, and operations 1400 illustrated in FIG. 14 correspond to means 1400A illustrated in FIG. 14A. For example, means for determining, means for performing, means for transmitting, means for receiving, means for sending, means for applying, means for providing, means for selecting, means for using, means for updating, means for obtaining, means for scheduling, means for evaluating, and/or means for measuring may include one or more processors or other elements, such as the transmit processor 264, the controller/processor 280, the receive processor 258, and/or antenna(s) 252 of the user equipment 120 illustrated in FIG. 2, and/or the transmit processor 220, the receive processor 238, the controller/processor 240, and/or antenna(s) 234 of the base station 110 illustrated in FIG. 2.

In one or more exemplary designs, the functions described may be implemented in hardware, software or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications performed by a base station (BS), comprising:
   providing an indication of a scheduled physical random access channel (PRACH) region comprising a set of transmission resources for transmitting scheduled PRACH signals by a first user equipment (UE), wherein:
   the scheduled PRACH region is within a narrowband region of a wider system bandwidth,
   the scheduled PRACH region is a subset of a set of PRACH resources indicated by the BS, and
   the indication comprises a parameter indicating a starting offset of the scheduled PRACH region from the set of PRACH resources; and
   transmitting a first command to the first UE to transmit a scheduled PRACH signal using transmission resources in the scheduled PRACH region.

2. The method of claim 1, further comprising:
   semi-statically updating the scheduled PRACH region.

3. The method of claim 2, wherein semi-statically updating the scheduled PRACH region comprises semi-statically updating the scheduled PRACH region periodically.

4. The method of claim 3, further comprising:
   transmitting an indication of a time for the semi-static updating in a system information block (SIB).

5. The method of claim 1, further comprising:
   determining to command the first UE to transmit the scheduled PRACH signal; and
   dynamically updating the scheduled PRACH region, based on the determination.

6. The method of claim 5, further comprising:
   transmitting an indication of the dynamic updating in a system information block (SIB).

7. The method of claim 1, wherein the scheduled PRACH region is a subset of a data transmission resources set.

8. The method of claim 7, further comprising:
   transmitting an indication that the first UE should disable random group hopping when transmitting the scheduled PRACH signal.

9. The method of claim 7, further comprising:
   transmitting a second command to a second UE to transmit another scheduled PRACH signal; and
   postponing transmitting the first command to the first UE until after transmitting the second command to the second UE.

10. The method of claim 7, further comprising:
    providing a set of guard tones between the scheduled PRACH region and a portion of the data transmission resources set excluding the scheduled PRACH region.

11. The method of claim 7, further comprising:
    determining to command the first UE to transmit the scheduled PRACH signal; and
    dynamically updating the scheduled PRACH region, based on the determination.

12. The method of claim 11, wherein the first command indicates a time for the first UE to transmit the scheduled PRACH signal.

13. The method of claim 7, further comprising:
    semi-statically updating the scheduled PRACH region.

14. The method of claim 13, further comprising:
    transmitting an indication of a time for the semi-static updating in a system information block (SIB).

15. The method of claim 1, further comprising transmitting the first command after determining once a need for a scheduled PRACH signal.

16. A method for wireless communications performed by a user equipment (UE), comprising:
receiving a command from a base station (BS) to transmit a scheduled physical random access channel (PRACH) signal to the BS;
obtaining an indication of a scheduled PRACH region comprising a set of transmission resources for transmitting scheduled PRACH signals to the BS, wherein:
the scheduled PRACH region is within a narrowband region of a wider system bandwidth,
the scheduled PRACH region is a subset of a set of PRACH resources indicated by the BS,
the indication comprises a parameter indicating a starting offset of the scheduled PRACH region from the set of PRACH resources; and
transmitting the PRACH signal to the BS using transmission resources in the scheduled PRACH region.

17. The method of claim 16, wherein the scheduled PRACH region is semi-statically updated.

18. The method of claim 17, wherein the semi-static updating occurs periodically.

19. The method of claim 18, further comprising:
receiving an indication of a time for the semi-static updating in a system information block (SIB).

20. The method of claim 16, wherein the scheduled PRACH region is dynamically updated.

21. The method of claim 20, further comprising:
receiving an indication of the dynamic updating in a system information block (SIB).

22. The method of claim 16, wherein the scheduled PRACH region is a subset of a data transmission resources set.

23. The method of claim 22, further comprising:
obtaining an indication that the UE should disable random group hopping when transmitting the PRACH signal; and
wherein transmitting the PRACH signal comprises transmitting the PRACH signal without using group hopping.

24. The method of claim 16, wherein the command indicates a time for the UE to transmit the PRACH signal.

25. An apparatus for wireless communications, comprising:
at least one processor configured to:
provide an indication of a scheduled physical random access channel (PRACH) region comprising a set of transmission resources for transmitting scheduled PRACH signals by a first user equipment (UE), wherein:
the scheduled PRACH region is within a narrowband region of a wider system bandwidth,
the scheduled PRACH region is a subset of a set of PRACH resources indicated by the BS,
the indication comprises a parameter indicating a starting offset of the scheduled PRACH region from the set of PRACH resources; and
transmit a first command to the first UE to transmit a scheduled PRACH signal using transmission resources in the scheduled PRACH region; and
a memory coupled to the at least one processor.

26. An apparatus for wireless communications, comprising:
at least one processor configured to:
receive a command from a base station (BS) to transmit a scheduled physical random access channel (PRACH) signal to the BS;
obtain an indication of a scheduled PRACH region comprising a set of transmission resources for transmitting scheduled PRACH signals to the BS, wherein:
the scheduled PRACH region is within a narrowband region of a wider system bandwidth,
the scheduled PRACH region is a subset of a set of PRACH resources indicated by the BS,
the indication comprises a parameter indicating a starting offset of the scheduled PRACH region from the set of PRACH resources; and
transmit the PRACH signal to the BS using transmission resources in the scheduled PRACH region; and
a memory coupled to the at least one processor.

* * * * *